United States Patent
Harita et al.

(10) Patent No.: US 7,511,093 B2
(45) Date of Patent: Mar. 31, 2009

(54) POLYVINYL ALCOHOL POLYMER FILM AND POLARIZATION FILM

(75) Inventors: Shigeyuki Harita, Kurashiki (JP); Takanori Isozaki, Kurashiki (JP); Naoki Fujiwara, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 11/411,173

(22) Filed: Apr. 26, 2006

(65) Prior Publication Data

US 2006/0264564 A1    Nov. 23, 2006

Related U.S. Application Data

(60) Division of application No. 10/661,522, filed on Sep. 15, 2003, now abandoned, which is a continuation of application No. 09/842,804, filed on Apr. 27, 2001, now abandoned.

(30) Foreign Application Priority Data

May 1, 2000    (JP)   ............................ 2000-132207
May 2, 2000    (JP)   ............................ 2000-133362

(51) Int. Cl.
    *C08L 29/04*     (2006.01)
(52) U.S. Cl. ................ 524/557; 524/81; 524/903; 359/251; 359/285; 359/301; 359/298
(58) Field of Classification Search ............ 524/81, 524/557, 903; 359/251, 285, 298, 301
See application file for complete search history.

(56) References Cited

U.S. PATENT DOCUMENTS

| | | | |
|---|---|---|---|
| 4,289,815 A | 9/1981 | Lee | |
| 4,340,491 A | 7/1982 | Lee | |
| 5,534,178 A | 7/1996 | Bailly et al. | |
| 5,631,051 A | 5/1997 | Ito | |
| 5,645,766 A | 7/1997 | Shiro et al. | |
| 5,759,449 A | 6/1998 | Shiro et al. | |
| 6,166,117 A | 12/2000 | Miyazaki | |
| 6,337,369 B1 * | 1/2002 | Isozaki | 525/61 |
| 6,803,411 B2 | 10/2004 | Harita et al. | |

FOREIGN PATENT DOCUMENTS

| | | |
|---|---|---|
| EP | 884352 A1 | 12/1998 |
| JP | 61-36201 | 8/1986 |
| JP | 05/245858 | 9/1993 |
| JP | 05245858 * | 9/1993 |
| JP | 05/337967 | 12/1993 |
| JP | 05337967 * | 12/1993 |
| JP | 06-289224 | 10/1994 |
| JP | 08-188624 | 7/1996 |
| JP | 09-15618 | 1/1997 |
| JP | 10/325907 | 12/1998 |

OTHER PUBLICATIONS

Translation to JP 05337967 Dec. 1993.*
Translation to JP 05245858 Sep. 1993.*
Patent Abstracts of Japan, JP 11-292983, Oct. 26, 1999.
Patent Abstracts of Japan, JP 11-181053, Jul. 6, 1999.
Patent Abstracts of Japan, JP 11-140120, May 25, 1999.
Patent Abstracts of Japan, JP 11-092575, Apr. 6, 1999.
Patent Abstracts of Japan, JP 11-049871, Feb. 23, 1999.
Patent Abstracts of Japan, JP 10-273506, Oct. 13, 1998.
Patent Abstracts of Japan, JP 10-245442, Sep. 14, 1998.
Patent Abstracts of Japan, JP 09-124876, May 13, 1997.
Patent Abstracts of Japan, JP 11-100715, Apr. 13, 1999.
"Study on the swelling of Polyvinyl Alcohol"; Ichiro Sakurada, et al.; The Society of Polymer Science, Japan, pp. 506-507, Tokyo, Japan, Dec. 1955.

* cited by examiner

*Primary Examiner*—Kelechi C Egwim
(74) *Attorney, Agent, or Firm*—Oblon, Spivak, McClelland, Maier & Neustadt, P.C.

(57) ABSTRACT

A polyvinyl alcohol polymer film includes a polyvinyl alcohol polymer and a plasticizer selected from the group consisting of ethylene glycol, glycerin, propylene glycol, diethylene glycol, diglycerin, triethylene glycol, tetraethylene glycol, and trimethylolpropane. The amount of the polyvinyl alcohol polymer eluted when a 10 cm square of the polyvinyl alcohol polymer film is left in 1 liter of water of 50° C. for 4 hours is from 1 to 100 ppm. The film has only a small number of defects and is useful as raw material for producing a polarization film.

11 Claims, No Drawings

POLYVINYL ALCOHOL POLYMER FILM AND POLARIZATION FILM

BACKGROUND OF THE INVENTION

1. Field of the Invention

The present invention relates to a polyvinyl alcohol polymer film which has small number of defects and is useful as a production raw material of a polarization film, and to a polarization film produced using this.

2. Description of the Prior Art

A polarizer having functions of transmission and shielding of light is a fundamental constituent element of a liquid crystal display (LCD), together with a liquid crystal having a function of switching light. This LCD is applied to portable apparatuses such as electronic calculators, wristwatches and the like in the initial period of development of LCD, and recently, to apparatuses in a wider range such as lap top personal computers, word processors, liquid crystal color projectors, navigation systems for automobiles, liquid crystal televisions, personal phones, indoor and outdoor measuring apparatuses and the like, and there is a need for polarizer having higher polarization characteristic and smaller defects than conventional products.

For obtaining a polarizer having general constitution, a polyvinyl alcohol polymer film (hereinafter, polyvinyl alcohol polymer is abbreviated as "PVA", and a polyvinyl alcohol film is abbreviated as "PVA film" in some cases) is monoaxially stretched before dyeing, or dyed before monoaxial stretching, and subjected to fixing treatment with a boron compound (in some cases, dyeing and fixing treatment are conducted simultaneously, or monoaxial stretching and fixing treatment are conducted simultaneously), then, a protection film such as a triacetic cellulose (TAC) film, cellulose acetate butyrate (CAB) and the like is laminated on the polarization film.

By using the above-mentioned polarizer and liquid crystal having a function of switching light, dichroic display such as white and black display is enabled, and color display is realized by combination of a color filter. For improving color reproducibility of a liquid crystal display, more white hue and more black hue are required without using color filter, and for this, smaller unnecessary coloration on a polarizer is necessary.

However, when a PVA film is stretched, PVA in the PVA film may be partially dissolved in a dyeing process and a fixing treatment process with a boron compound in the case of dry stretching, and also in a swelling process before stretching and a stretching process in addition to the dyeing process and fixing treatment process in the case of wet stretching. The dissolved PVA is deposited in a vessel and adheres to a PVA film and polarization film, or deposited on a PVA film and polarization film, providing a defect, and consequently, decreases the yield of the polarization film. Further, dissolved PVA which has not been deposited causes expensive waste water treatment, problematically.

Furthermore, a conventional PVA film which is a raw material of a polarization film has a problem that unnecessary coloration tends to occur by conducting heat treatment in producing a polarization film. Particularly when a polarizer is made by a dry stretching method, unnecessary coloration such as yellowing and the like tends to occur. Therefore, a PVA film causing little unnecessary coloration even if heat treatment is effected in producing a polarization film has been desired to be realized.

Then, an object of the present invention is to provide a PVA film useful as a raw material for producing a polarization film having a small number of defects, and a polarization film made by using this PVA film.

Further, another object of the present invention is to provide a PVA film which causes little unnecessary coloration and is useful as a raw material of a polarization film, and a polarization film made by using this PVA film.

SUMMARY OF THE INVENTION

For attaining the above-mentioned objects, in the PVA film of the present invention, the amount of PVA eluted when a 10 cm square PVA film is left in 1 liter of water of 50° C. for 4 hours is from 1 to 100 ppm.

The PVA film of the present invention gives lower amount of PVA eluted in each process (dyeing, fixing treatment, swelling, stretching or the like) in producing a polarization film, therefore, a polarization film having a smaller number of defects is obtained in high yield by using this PVA film. Also, waste water treatment becomes easy.

Further, according to the PVA film of the present invention, unnecessary coloration can be decreased by controlling the content of an alkali metal compound to 0.5% by weight or less based on polyvinyl alcohol.

The method of producing a PVA film of the present invention is characterized in that film formation is conducted using a PVA raw material having a content of an alkali metal compound of 0.5% by weight or less based on PVA, and further preferably, film formation is conducted using a film formation raw material prepared at temperatures of 150° C. or less.

According to the present invention, the intended PVA film for a polarization film can be obtained assuredly.

DETAILED DESCRIPTION OF EMBODIMENTS OF THE INVENTION

The present invention will be illustrated in detail below.

PVA used in the present invention is produced, for example, by hydrolyzing a polyvinyl ester obtained by polymerizing a vinyl ester. Further, there are listed modified PVAs obtained by graft copolymerization of the above-mentioned PVA with unsaturated carboxylic acids or derivatives thereof, unsaturated sulfonic acids or derivatives thereof, α-olefins having 2 to 30 carbon atoms and the like in a proportion of less than 15 mol %, modified PVAs produced by hydrolyzing modified polyvinyl esters obtained by copolymerizing a vinyl ester with unsaturated carboxylic acids or derivatives thereof, unsaturated sulfonic acids or derivatives thereof, α-olefins having 2 to 30 carbon atoms and the like in a proportion of less than 15 mol %, so-called polyvinyl acetal resins obtained by partially crosslinking hydroxyl groups of non-modified or modified PVA with aldehydes such as formalin, butyl aldehyde, benzaldehyde and the like, and other resin.

As the above-mentioned vinyl ester, vinyl acetate, vinyl formate, vinyl propionate, vinyl butyrate, vinyl pivalate, vinyl versatate, vinyl laurate, vinyl stearate, vinyl benzoate and the like are listed, and mixtures of two or more of these compounds are also listed.

On the other hand, the comonomer used in the modified PVA is copolymerized mainly for the purpose of modifying PVA, therefore, used in an amount which does not lose the purpose of the present invention providing it can be copolymerized with the above-mentioned vinyl ester. As such comonomer, there are listed, for example, α-olefins such as ethylene, propylene, 1-butene, isobutene and the like; acrylic acid and salts thereof, acrylates such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, octadecyl acrylate and the like; methacrylic acid and salts thereof; methacrylates such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, octadecyl methacrylate and the like; acrylamide derivatives such as acrylamide, N-methylacrylamide, N-ethylacrylamide, N,N-dimethylacrylamide, diacetoneacrylamide, acrylamidepropanesulfonic acid and salts thereof, acrylamidepropyldimethylamine and salts thereof, N-methylolacrylamide and derivatives thereof and the like; methacrylamide derivatives such as methacrylamide, N-methylmethacrylamide, N-ethylmethacrylamide, methacrylamidepropanesulfonic acid and salts thereof, methacrylamidepropyldimethylamine and salts thereof, N-methylolmethacrylamide and derivatives thereof and the like; N-vinylamides such as N-vinylformamide, N-vinylacetamide, N-vinylpyrolidone and the like; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether and the like; nitriles such as acrylonitrile, methacrylonitrile and the like; vinyl halides such as vinyl chloride, vinylidene chloride, vinyl fluoride, vinylidene fluoride and the like; allyl compounds such as allyl acetate, allyl chloride and the like; maleic acid and salts or esters thereof; itaconic acid and salts or esters thereof; vinylsilyl compounds such as vinyltrimethoxysilane and the like; isopropenyl acetate, and the like. Among them, α-olefins are preferable, and ethylene is particularly preferable.

The modification amount of modified PVA is preferably less than 15 mol %.

The degree of hydrolysis of PVA is preferably at least 97 mol %, more preferably at least 98 mol %, further preferably at least 99 mol %, most preferably at least 99.5 mol %, from standpoints of elution amount and durcharacteristic.

The above-mentioned degree of hydrolysis represents a ratio of units actually hydrolyzed into vinyl alcohol units in units which can be converted into vinyl alcohol units by hydrolysis. The degree of hydrolysis of PVA was measured by a method described in JIS.

The degree of polymerization of PVA is preferably at least 1000 from the standpoints of reduction in the elution amount of PVA and the strength of a PVA film, and more preferably at least 1500, further preferably at least 2000, and particularly, most preferably at least 2500, from the standpoint of polarization characteristic. The upper limit of degree of polymerization of PVA is preferably at most 8000, and more preferably at most 6000.

The above-mentioned degree of polymerization of PVA is measured according to JIS K 6726. Namely, PVA is re-hydrolyzed and purified, then, intrinsic viscosity is measured in water at 30° C. from which the degree of polymerization is calculated.

It is important to wash, with water or hot water, PVA in the form of tip before a process of preparing a PVA solution for film formation or water-containing PVA described below, to preliminarily remove PVA which tends to be eluted. The water or hot water used for washing may also contain an organic solvent, plasticizer and surfactant such as acetic acid, methanol, glycerin, and the like, in an amount which does not lose the object of the present invention.

The temperature of the water or hot water used for washing is preferably from 10 to 90° C., more preferably from 20 to 80° C., further preferably from 25 to 70° C., and particularly, most preferably from 30 to 60° C. When the temperature of water is lower than 10° C., washing of an eluted substance can not be conducted sufficiently, while, when the temperature of hot water is over 90° C., the elution amount of PVA in washing is large, increasing loss, and PVAs are stuck mutually, deteriorating workcharacteristic in the following solution process and the like, undesirably.

The bath ratio by weight of water or hot water to PVA tips is preferably at least 1, more preferably at least 1.5, and particularly, most preferably at least 2. When the bath ratio is less than 1, the amount of water or hot water is small, consequently, washing can not be effected sufficiently, and an effect to reduce the elution amount of PVA is small. The upper limit of the bath ratio is 100 or less. Namely, even if the bath ratio is over 100, there is no corresponding large improvement in the washing effect, and water or hot water is futile, leading to diseconomy.

The time of washing a PVA tip (time from contact of a PVA tip with water to completion of draining) is preferably at least 30 seconds, more preferably at least 1 minute, further preferably at least 5 minutes, and particularly, most preferably at least 10 minutes.

The method of washing a PVA tip is not particularly restricted, and there are listed a method in which water or hot water is showered on PVA tips on a net or belt, then, drained, a method in which water or hot water and PVA tips are placed batch-wise in a tower or vessel and allowed to stand still or stirred, then, drained, a method in which water or hot water and PVA tips are fed continuously in a tower or vessel, and washed in countercurrent flow or concurrent flow (may be accompanied by stirring), then, drained, and other methods.

The draining method after washing is also not particularly restricted, and there are listed centrifugal separation, vacuum suction, filter press, compression using rolls and belts, separation by gravity using a porous plate such as a net, and cloth, non-woven cloth and the like, decantation, and the like.

Washing water such as water adhered on surface, releasing water and the like may remain, in an amount which does not lose the object of the present invention, on PVA tips after drainage, however, it is preferable that water used in washing is separated and removed from PVA tips as completely as possible.

For producing a PVA film using PVA tips washed preliminarily, a PVA solution prepared by dissolving PVA tips in a solvent is subjected to a casting film formation method, wet film formation method (discharging into a poor solvent), gel film formation method (a PVA aqueous solution is once cooled and gelled, then, water is removed by extraction to obtain a PVA film), and a combination method thereof, or a melt extrusion film formation method in which water-containing PVA prepared by allowing PVA tips to contain water (may also contain an organic solvent and the like) is melt-extruded, and other methods can be used. Of them, the casting film formation method and melt extrusion film formation method are preferable since an excellent polarization film is obtained.

Examples of the solvent for dissolving PVA tips washed preliminarily used in producing a PVA film include dimethylsulfoxide, dimethylformamide, dimethylacetamide, N-methylpyrolidone, ethylene glycol, glycerin, diglycerin, propylene glycol, diethylene glycol, triethylene glycol, tetraethylene glycol, trimethylolpropane, ethylenediamine, diethylenetriamine, water and the like, and one or more of them can be used. Among them, water, dimethylsulfoxide, or a mixed solvent of water and dimethylsulfoxide is suitably used.

The PVA concentration of a PVA solution or water-containing PVA used in producing a PVA film is preferably from 3 to 70% by weight, more preferably from 10 to 60% by weight, further preferably from 13 to 55% by weight, an particularly, most preferably from 15 to 50% by weight. This PVA solution or water-containing PVA may also contain a plasticizer, surfactant, dichroic dye and the like, if necessary.

As the plasticizer used in producing a PVA film, a polyhydric alcohol is preferably added. Examples of the polyhydric alcohol include ethylene glycol, glycerin, propylene glycol, diethylene glycol, diglycerin, triethylene glycol, tetraethylene glycol, trimethylolpropane and the like, and one or more of them can be used. Among them, diglycerin, ethylene glycol and glycerin are suitably used for improving stretching property.

The amount of polyhydric alcohol used is preferably from 1 to 30 parts by weight, more preferably from 3 to 25 parts by weight, and particularly, most preferably from 5 to 20 parts by weight, based on 100 parts by weight of PVA. When the use amount is less than 1 part by weight, dyeing property and stretching property may decrease, and when over 30 parts by weight, a PVA film may become too soft, leading to reduction in handling.

In producing a PVA film, it is preferable to add a surfactant. The kind of the surfactant is not particularly restricted, and anionic surfactants or nonionic surfactants are preferable. As the anionic surfactant, for example, carboxylic acid-type anionic surfactants such as potassium laurate, sulfate-type anionic surfactants such as octyl sulfate and the like, and sulfonic acid-type anionic surfactants such as dodecylbenzenesulfonate and the like, are suitable. As the nonionic surfactant, for example, alkyl ether-type nonionic surfactants such as polyoxyethylene oleyl ether and the like, alkylphenyl ether-type nonionic surfactants such as polyoxyethylene octylphenyl ether and the like, alkyl ester-type nonionic surfactants such as polyoxyethylene laurate and the like, alkylamine-type nonionic surfactants such as polyoxyethylene laurylamino ether and the like, alkylamide-type nonionic surfactants such as polyoxyethylene lauric amide and the like, polypropylene glycol ether-type nonionic surfactants such as polyoxyethylene polyoxypropylene ether and the like, alkanolamide-type nonionic surfactants such as oleic acid diethanol amide and the like, allylphenyl ether-type nonionic surfactants such as polyoxyalkylene allylphenyl ether and the like, are suitable. These surfactants can be used alone or in combination of two or more.

The amount of the surfactant added is preferably from 0.01 to 1 part by weight, more preferably from 0.02 to 0.5 parts by weight, and particularly, most preferably from 0.05 to 0.3 parts by weight, based on 100 parts by weight of PVA. When the addition amount is less than 0.01 part by weight, effects of improving stretching property and improving dyeing property are not manifested easily, and when over 1 part by weight, the surfactant may be eluted on the surface of a PVA film and cause blocking, leading to reduction in handling.

In producing a PVA film, it is preferable to effect drying sufficiently after film formation, for reducing the elution amount of PVA, in addition to the above-mentioned washing.

It is important for the PVA film of the present invention that the amount of PVA eluted when a 10 cm square PVA film is left in 1 liter of water of 50° C. for 4 hours is from 1 to 100 ppm. Preferably, this elution amount is from 5 to 80 ppm, and particularly, most preferably from 10 to 60 ppm. When the elution amount of PVA is over 100 ppm, the elution amount of PVA into a vessel increases and the amount of PVA deposited on a PVA film and a polarization film increases, obtaining a polarization film having a smaller number of defects becomes difficult, and problems occur in waste water treatment. For realizing an elution amount of PVA of less than 1 ppm, an extremely large amount of preliminary washing water is necessary expensively, and in addition, high degree of heat treatment after film formation and drying is necessary, leading to deterioration in monoaxial stretching property, and resultantly, an excellent polarization film is not obtained easily.

The method for measuring the elution amount of PVA is as follows. A 10 cm square PVA film is left in 1 liter of distilled water of 50° C. for 4 hours, and the eluted liquid thereof is colored with an iodine-potassium iodide solution, and within 10 minutes, the absorbancy of a peak showing the maximum absorption is measured by a spectrophotometer, UV1200 manufactured by Shimadzu Corp. Since the wavelength of a peak showing the maximum absorption differs depending on the degree of polymerization and degree of hydrolysis of PVA (generally, existing around 650 to 700 nm), raw PVA or PVA obtained by preliminaryly removing and purifying additives and the like from a PVA film is used to make a calibration curve, and the elution amount of PVA (PVA concentration in eluted liquid) is quantified from absorbancy obtained from a sample.

The coloration method with an iodine-potassium iodide solution is as follows. 450 ml of a boric acid aqueous solution prepared by dissolving 40 g of boric acid in 1000 ml of ion-exchange water, and 90 ml of an iodine-potassium iodide aqueous solution prepared by dissolving 12.7 g of potassium iodide and 25 g of iodine in 100 ml of ion exchange water are mixed, and to the resulted mixture is added 300 ml of ion exchange water for dilution, and the temperature of this mixture is controlled to 20° C. to give a coloration reagent. In an Erlenmeyer flask equipped with a plug, to 10 ml of the extracted liquid cooled to 20° C. is added 10 ml of the coloration reagent to give a mixture which was left for 15 minutes at 20° C. When the PVA concentration in the extracted liquid is too high, the extracted liquid may be diluted with ion exchange water, if necessary.

The content of an alkali metal compound in the PVA film of the present invention is preferably 0.5% by weight or less, more preferably 0.3% by weight or less, more further preferably 0.1% by weight or less, based on PVA. When the content of an alkali metal compound is over 0.5% by weight, coloration occurs on a polarization film, when heated in a process of dry heat stretching, and the like. From the standpoint of coloration, lower concentration of an alkali metal compound in PVA is more preferable, and from the industrial standpoint, the lower limit is preferably 0.001% by weight.

In the PVA film of the present invention, the alkali metal compound means a compound containing an alkali metal such as lithium, sodium, potassium and the like, and for example, lithium acetate, sodium acetate, potassium acetate, sodium hydroxide, potassium hydroxide, sodium tartarate, sodium lactate, sodium phosphate and the like are listed. Among them, it is preferable to control the content of sodium acetate since sodium acetate tends to exert an influence on coloration of a PVA film.

To control the content of an alkali metal compound in the PVA film of the present invention to 0.5% by weight or less, preferably 0.3% by weight or less, further preferably 0.1% by weight or less, it is necessary that the content of an alkali metal compound in a PVA raw material used as a film formation raw material is 0.5% by weight or less, preferably 0.3% by weight or less, further preferably 0.1% by weight or less. To reduce the content of an alkali metal compound in a PVA raw material, it is preferable, for example, to wash a PVA raw material sufficiently with an acidic aqueous solution such as an acetic acid aqueous solution and the like, then, with a solvent such as water and the like, sufficiently.

In the present invention, it is preferable to form a PVA film using a film formation raw material containing PVA prepared at temperatures of 150° C. or less. The reason for this is that treating temperature in preparing a film formation raw material (temperature in dissolving a PVA raw material in solvent or in melting water-containing PVA) exerts an influence on the hue of the resulting polarization film. When the treating temperature in preparing a film formation raw material is over 150° C., the resultant PVA film may manifest yellowish color, further, a polarization film produced from this PVA film may also manifest yellowish color. The treating temperature in preparing a film formation raw material is preferably 150° C. or less, further preferably 140° C. or less.

The drying temperature in a process of drying a PVA film is preferably 150° C. or less, further preferably 140° C. or less. When the drying temperature is over 150° C., the resultant PVA film may manifest yellowish color.

The thickness of a PVA film is preferably from 5 to 150 μm, more preferably from 20 to 100 μm, further preferably from 30 to 90 μm, most preferably from 35 to 80 μm.

For producing a polarization film from the PVA film of the present invention, for example, the PVA film may advantageously be subjected to dyeing, monoaxial stretching, fixing treatment, drying treatment, further if necessary, heat treatment, and the operation order of dyeing, monoaxial stretching and fixing treatment is not particularly restricted. Further, monoaxial stretching may also be conducted twice or more times.

The dyeing can be effected at any period before monoaxial stretching, in monoaxial stretching and after monoaxial stretching. As the dye used in the dying, dichroic dyes such as iodine-potassium iodide; Direct Black 17, 19, 154; Direct Brown 44, 106, 195, 210, 223; Direct Red 2, 23, 28, 31, 37, 39, 79, 81, 240, 242, 247; Direct Blue 1, 15, 22, 78, 90, 98, 151, 168, 202, 236, 249, 270; Direct Violet 9, 12, 51, 98; Direct Green 1, 85; Direct Yellow 8, 12, 44, 86, 87; Direct Orange 26, 39, 106, 107, and the like can be used alone or in combination of two or more. Generally, dyeing is conducted, usually, by immersing a PVA film in a solution containing the above-mentioned dye, however, treatment conditions and treatment methods thereof such as mixing of a dye with a PVA film before film formation, and the like, are not particularly restricted.

For the monoaxial stretching, a wet stretching method or dry heat stretching method can be used, and it can be conducted in hot water (may also in a solution containing the above-mentioned dye or a fixing treatment bath described below) or in air using a PVA film after water absorption. The hot water used in the monoaxial stretching is preferably a boric acid aqueous solution. The stretching temperature is not particularly restricted, and when a PVA film is stretched in hot water (wet stretching), temperatures from 30 to 90° C. are suitable, and when dry heat stretching is conducted, temperatures from 50 to 180° C. are suitable. The stretching ratio in monoaxial stretching (in the case of multi-stage stretching, the total stretching ratio) is preferably at least 4-fold, and particularly, most preferably at least 5-fold, from the standpoint of polarization characteristic. The upper limit of the stretching is not particularly restricted, and ratios of 8-fold or less are preferable since then uniform stretching is obtained. The thickness of a film after stretching is preferably from 3 to 75 μm, more preferably from 5 to 50 μm.

The fixing treatment is often conducted for the purpose of rendering adsorption of the above-mentioned dye onto a PVA film stronger. Into a treating bath used for the fixing treatment, boric acid and/or boron compound is usually added. If necessary, an iodine compound may also be added into the treating bath.

The drying treatment (heat treatment) of the above-mentioned PVA film is conducted at a temperature preferably from 30 to 150° C., more preferably from 50 to 150° C.

On a polarization film obtained as described above, a protective film having optically transparent and having mechanical strength is laminated on each surface or on one surface thereof to provide a polarizer to be used. As the protective film, a triacetic cellulose (TAC) film, cellulose acetate butyrate (CAB) film, acrylic film, polyester film and the like are used. As the adhesive for lamination, PVA adhesives and urethane adhesives are listed, and of them, PVA adhesives are suitable.

Regarding the hue of a polarization film obtained from the PVA film of the present invention, when the hue of a single body is measured according to JIS Z 8719 (light source: C, field of view: 2°), a* value is preferably from −1.6 to +1.6, further preferably from −1.5 to +1.5. b* value is preferably from −3.0 to +3.0, further preferably from −1.5 to +1.5.

EXAMPLES

The following examples illustrate the present invention specifically, but dot not limit the scope of the present invention. Dichroic ratio and hue in the examples were evaluated by the following methods.

Dichroic Ratio

Dichroic ratio was used as an index for evaluating polarization characteristic of the resulted polarization film. This dichroic ratio was obtained from the following formula using transmittance Ts (%) and degree of polarization P (%) obtained by calculation and measurement at 2° field of view and C light source using a spectrophotometer according to Standards of Electronic Industries Association of Japan (EIAJ) LD-201-1983.

Dichroic ratio=log ($Ts$/100−$Ts$/100×$P$/100)/log($Ts$/100+$Ts$/100×$P$/100)

Hue:

Hue was measured according to JIS Z 8719 (light source: C, field of view: 2°).

Example 1

PVA tips were washed with hot water having a temperature of 40° C. for 15 minutes at a bath ratio by weight of 3. This PVA had a degree of hydrolysis of 99.9 mol % and a degree of polymerization of 1750. An aqueous solution was prepared having a PVA concentration of 15% by weight containing 100 parts by weight of this PVA and 10 parts by weight of glycerin. Then, this aqueous solution was cast on a metal roll of 90° C. to form a film which was dried, and the film was further dried on a metal roll of 100° C., to obtain a PVA film having a thickness of 75 μm.

A 10 cm square PVA film cut out from this PVA film was left in 1 liter of water of 50° C. for 4 hours, and the amount of PVA eluted was 50 ppm at this point.

The above-mentioned PVA film was subjected to preliminary swelling, dyeing, monoaxial stretching, fixing treatment, drying and heat treatment in this order, to produce a polarization film. Namely, this PVA film was immersed in water of 30° C. for 5 minutes to effect preliminary swelling, and immersed in an aqueous solution of 35° C. having an iodine concentration of 0.4 g/liter and a potassium iodide concentration of 40 g/liter for 3 minutes. Subsequently, monoaxial stretching was conducted at 5.3 times in an aqueous solution of 40° C. having a boric acid concentration of 4%, then the stretched film was immersed in an aqueous solution of 30° C. having a potassium iodide concentration of 40 g/liter, a boric acid concentration of 40 g/liter and a zinc chloride concentration of 10 g/liter for 5 minutes to effect fixing treatment. Then, the PVA film was removed, and dried with hot air of 40° C. and further, heat-treated at 100° C. for 5 minutes, while maintaining the length constant.

Thus obtained polarization film had a thickness of 22 μm, a transmittance of 43.3%, a degree of polarization of 98.5%, and a dichroic ratio of 33.3. Further, defects due to deposition of PVA was not found even when a polarization film was produced continuously using the above-mentioned PVA film.

Example 2

PVA tips were washed with hot water having a temperature of 35° C. for 2 hours at a bath ratio by weight of 4. This PVA had a degree of hydrolysis of 99.9 mol % and a degree of polymerization of 4000. To 100 parts by weight of this PVA and 10 parts by weight of glycerin was added water so as to give a PVA concentration of 40% by weight and the mixture was melt-kneaded in an extruder, and melt-extruded through a dice onto a metal roll of 90° C. and dried thereon, to obtain a PVA film having a thickness of 75 μm.

A 10 cm square PVA film cut out from this PVA film was left in 1 liter of water of 50° C. for 4 hours, and the amount of PVA eluted was 40 ppm at this point.

The above-mentioned PVA film was subjected to preliminary swelling, dyeing, monoaxial stretching, fixing treatment, drying and heat treatment in this order, to produce a polarization film. Namely, this PVA film was immersed in water of 30° C. for 5 minutes to effect preliminary swelling, and immersed in an aqueous solution of 35° C. having an iodine concentration of 0.4 g/liter and a potassium iodide concentration of 40 g/liter for 3 minutes. Subsequently, monoaxial stretching was conducted at 5.5 times in an aqueous solution of 40° C. having a boric acid concentration of 4%, then the stretched film was immersed in an aqueous solution of 30° C. having a potassium iodide concentration of 40 g/liter, a boric acid concentration of 40 g/liter and a zinc chloride concentration of 10 g/liter for 5 minutes to effect fixing treatment. Then, the PVA film was removed, and dried with hot air of 40° C. and further, heat-treated at 100° C. for 5 minutes, while maintaining the length constant.

Thus obtained polarization film had a thickness of 22 μm, a transmittance of 43.0%, a degree of polarization of 99.6%, and a dichroic ratio of 41.7. Further, defects due to deposition of PVA was not found even when a polarization film was produced continuously using the above-mentioned PVA film.

Comparative Example 1

A PVA film was obtained in the same manner as in Example 1 except that PVA tips were not washed.

A 10 cm square PVA film cut out from this PVA film was left in 1 liter of water of 50° C. for 4 hours, and the amount of PVA eluted was 200 ppm at this point.

The above-mentioned PVA film was treated in the same manner as in Example 1. The obtained polarization film had a thickness of 23 μm. It had a transmittance of 43.2%, a degree of polarization of 98.5%, and a dichroic ratio of 32.8, showing no problem on abilities. Further, at the initial period of producing a polarization film, the film could be produced without problem, however, with progress of continuous production of a polarization film, defects due to deposition of PVA were found on scattered sites of the polarization film, and the yield of the polarization film decreased gradually.

Comparative Example 2

A PVA film was obtained in the same manner as in Example 1 except that glycerin was not added, and heat treatment at 190° C. was conducted instead of drying on a metal roll of 100° C.

A 10 cm square PVA film cut out from this PVA film was left in 1 liter of water of 50° C. for 4 hours, and the amount of PVA eluted was 0.5 ppm at this point.

The above-mentioned PVA film was tried to be subjected to the same treatments as in Example 1, however, cutting occurred frequently during stretching and a polarization film was not obtained in stable manner.

Comparative Example 3

PVA tips were washed with water having a temperature of 5° C. for 5 minutes at a bath ratio by weight of 0.8. This PVA had a degree of hydrolysis of 99.6 mol % and a degree of polymerization of 4000. A PVA film was obtained in the same manner as in Example 2 except that to 100 parts by weight of this PVA and 10 parts by weight of glycerin was added water so as to give a PVA concentration of 50% by weight and the mixture was melt-kneaded in an extruder.

A 10 cm square PVA film cut out from this PVA film was left in 1 liter of water of 50° C. for 4 hours, and the amount of PVA eluted was 150 ppm at this point.

The above-mentioned PVA film was treated in the same manner as in Example 2. The obtained polarization film had a thickness of 22 μm. It had a transmittance of 42.5%, a degree of polarization degree of 99.7%, and a dichroic ratio of 40.6. Further, at the initial period of producing a polarization film, the film could be produced without problem, however, with progress of continuous production of a polarization film, defects due to deposition of PVA were found on scattered sites of the polarization film, and the yield of the polarization film decreased gradually.

Example 3

100 parts by weight of PVA tips having a sodium acetate content of 2.4% by weight (degree of hydrolysis: 99.9 mol %, degree of polymerization: 4000) were immersed in 2500 parts by weight of distilled water of 35° C. for 24 hours, then, dehydrated centrifugally. The resulted PVA tip had a sodium acetate content of 0.1% by weight based on PVA. 200 parts by weight of the water-containing PVA tips, 15 parts by weight of glycerin and water were dissolved at 120° C. in a tank to prepare a PVA solution having a volatile content of 90% by weight. This PVA solution was cooled to 100° C. by a heat exchanger, then, cast on a metal drum at 95° C. to form a film which was subsequently dried, to obtain a PVA film having a width of 1.2 m and an average thickness of 75 μm and a sodium acetate content of 0.1% by weight based on PVA. A 10 cm square PVA film cut out from this PVA film was left in 1 liter of water of 50° C. for 4 hours, and the amount of PVA eluted was 8 ppm at this point.

This PVA film was subjected to monoaxial stretching, dyeing, fixing treatment, drying and heat treatment in this order, to produce a polarization film. Namely, this PVA film was monoaxially stretched at 4.5 times at 110° C. This monoaxially stretched PVA film was immersed in an aqueous solution of 40° C. having an iodine concentration of 0.8 g/liter, a potassium iodide concentration of 50 g/liter and a boric acid concentration of 40 g/liter for 1 minute while maintaining this film under stressed condition. Subsequently, the film was immersed in an aqueous solution of 65° C. having a potassium iodide concentration of 60 g/liter and a boric acid concentration of 70 g/liter for 5 minutes to effect fixing treatment. Then, this was washed with distilled water of 20° C. for 10 seconds, then, dried with hot air of 40° C. and further, heat-treated at 100° C. for 5 minutes, while maintaining the length constant.

The obtained polarization film had a thickness of 35 μm at the central part along width direction, a transmittance of 44.0%, a degree of polarization of 99.2%, and a dichroic ratio of 42.8. The hue of a single body was measured according to JIS Z 8719 (light source: C, field of view: 2°), a* was −1.2 and b* value was +0.8.

Example 4

100 parts by weight of PVA having a sodium acetate content of 1.9% by weight (degree of hydrolysis: 99.9 mol %, degree of polymerization: 2400) were immersed in 10000 parts by weight of distilled water of 30° C. for 24 hours, then, dehydrated centrifugally. The resulted PVA had a sodium acetate content of 0.03% by weight based on PVA. Water-containing tips having a volatile content of 70% by weight obtained by impregnating 200 parts by weight of the water-containing PVA tips with 15 parts by weight of glycerin and water were heat-melted in an extruder having a maximum temperature of 130° C. The melted substance was cooled to 100° C. by a heat exchanger, then, melt-extruded on a metal drum at 95° C. to form a film which was subsequently dried. A PVA film having a width of 1.2 m and an average thickness of 75 μm and a sodium acetate content of 0.03% by weight based on PVA was obtained. A 10 cm square PVA film cut out from this PVA film was left in 1 liter of water of 50° C. for 4 hours, and the amount of PVA eluted was 2 ppm at this point.

This PVA film was subjected to monoaxial stretching, dyeing, fixing treatment, drying and heat treatment in this order, to produce a polarization film. Namely, this PVA film was monoaxially stretched at 4.5 times at 100° C. This monoaxially stretched PVA film was immersed in an aqueous solution of 40° C. having an iodine concentration of 0.8 g/liter and a potassium iodide concentration of 50 g/liter for 1 minute while maintaining this film under stressed condition. Subsequently, the film was immersed in an aqueous solution of 65° C. having a potassium iodide concentration of 60 g/liter and a boric acid concentration of 70 g/liter for 5 minutes to effect fixing treatment. Then, this was washed with distilled water of 20° C. for 10 seconds, then, dried with hot air of 40° C. and further, heat-treated at 100° C. for 5 minutes, while maintaining the length constant.

The obtained polarization film had a thickness of 35 μm at the central part along width direction, a transmittance of 43.5%, a degree of polarization of 99.1%, and a dichroic ratio of 38.6. The hue of a single body was measured according to JIS Z 8719 (light source: C, field of view: 2°), a* was −1.0 and b* value was +0.4.

Comparative Example 4

Water-containing PVA tips having a volatile content of 70% by weight composed of 100 parts by weight of PVA tips having a sodium acetate content of 1.9% by weight (degree of hydrolysis: 99.9 mol %, degree of polymerization: 2400), 15 parts by weight of glycerin and water was heat-melted in an extruder having a maximum temperature of 130° C. The melted substance was cooled to 100° C. by a heat exchanger, then, melt-extruded on a metal drum at 95° C. to form a film which was subsequently dried. A PVA film having a width of 1.2 m and an average thickness of 75 μm and a sodium acetate content of 1.9% by weight based on PVA was obtained. A 10 cm square PVA film cut out from this PVA film was left in 1 liter of water of 50° C. for 4 hours, and the amount of PVA eluted was 180 ppm at this point.

This PVA film was subjected to monoaxial stretching, dyeing, fixing treatment, drying and heat treatment in this order, to produce a polarization film. Namely, this PVA film was monoaxially stretched at 4.5 times at 110° C. This monoaxially stretched PVA film was immersed in an aqueous solution of 40° C. having an iodine concentration of 0.8 g/liter and a potassium iodide concentration of 50 g/liter for 1 minute while maintaining this film under stressed condition. Subsequently, the film was immersed in an aqueous solution of 65° C. having a potassium iodide concentration of 60 g/liter and a boric acid concentration of 70 g/liter for 5 minutes to effect fixing treatment. Then, this was washed with distilled water of 20° C. for 10 seconds, then, dried with hot air of 40° C. and further, heat-treated at 100° C. for 5 minutes, while maintaining the length constant.

The obtained polarization film had a thickness of 35 μm at the central part along width direction, a transmittance of 42.8%, a degree of polarization of 98.9%, and a dichroic ratio of 33.3. The hue of a single body was measured according to JIS Z 8719 (light source: C, field of view: 2), a* was −1.8 and b* value was +3.8.

Although the present invention has been fully described in connection with the preferred embodiments thereof, those skilled in the art will readily conceive of numerous changes and modifications within the framework of obviousness upon the reading of the specification herein presented of the present invention. Accordingly, such changes and modifications are, unless they depart from the scope of the present invention as delivered from the claims annexed thereto, to be construed as included therein.

What is claimed is:

1. A polyvinyl alcohol polymer polarization film made by a process including dyeing with a dye, stretching and fixing a polyvinyl alcohol polymer film, wherein the polyvinyl alcohol polymer film is produced by a method comprising:
   (a) washing a polyvinyl alcohol polymer,
   (b) preparing a polyvinyl alcohol polymer solution or a water-containing polyvinyl alcohol polymer from the washed polyvinyl alcohol polymer, and
   (c) forming the polyvinyl alcohol polymer film from the polyvinyl alcohol polymer solution or the water-containing polyvinyl alcohol polymer, wherein
   an amount of the polyvinyl alcohol polymer eluted when a 10 cm square of the polyvinyl alcohol polymer film having a thickness of 30 to 90 μm is left in 1 liter of water at 50° C. for 4 hours is from 1 to 60 ppm, and
   a content of an alkali metal compound in the polyvinyl alcohol polymer film is 0.5% by weight or less based on the polyvinyl alcohol polymer.

2. The polyvinyl alcohol polymer polarization film according to claim 1, wherein a plasticizer is added to the polyvinyl alcohol polymer.

3. The polyvinyl alcohol polymer polarization film according to claim 2, wherein the amount of the plasticizer is from 1 to 30 parts by weight based on 100 parts by weight of the polyvinyl alcohol polymer.

4. The polyvinyl alcohol polymer polarization film according to claim 2, wherein the plasticizer is selected from the group consisting of ethylene glycol, glycerin, propylene glycol, diethylene glycol, diglycerin, triethylene glycol, tetraethylene glycol, and trimethyloipropane.

5. The polyvinyl alcohol polymer polarization film according to claim 1, wherein the alkali metal compound is sodium acetate.

6. The polyvinyl alcohol polymer polarization film according to claim 1, wherein the polyvinyl alcohol polymer is washed with water of a temperature from 10° C. to 90° C. where a bath ratio by weight of water to the polyvinyl alcohol polymer is from 1 to 100.

7. The polyvinyl alcohol polymer polarization film according to claim 1, wherein the polyvinyl alcohol polymer solution or water-containing polyvinyl alcohol polymer is prepared at a temperature of 150° C. or less from the washed polyvinyl alcohol polymer.

8. The polyvinyl alcohol polymer polarization film according to claim 1, wherein the polyvinyl alcohol polymer film is dried at a temperature of 150° C. or less after the polyvinyl alcohol polymer film is formed by using the polyvinyl alcohol polymer solution or water-containing polyvinyl alcohol polymer.

9. The polyvinyl alcohol polymer polarization film according to claim 1, wherein the polyvinyl alcohol polymer is a polymer obtained by saponification of a vinyl ester homopolymer or a copolymer of a vinyl ester and a monomer copolymerizable with the vinyl ester.

10. The polyvinyl alcohol polymer polarization film according to claim 1, wherein a solvent for preparing the polyvinyl alcohol polymer solution is water, dimethylsulfoxide or a mixture thereof.

11. A method of producing a polyvinyl alcohol polymer polarization film comprising:
(1) producing a polyvinyl alcohol polymer film by steps comprising:
  (a) washing a raw material polyvinyl alcohol polymer,
  (b) preparing a polyvinyl alcohol polymer solution or a water-containing polyvinyl alcohol polymer from the washed polyvinyl alcohol polymer, and
  (c) forming a polyvinyl alcohol polymer film from the polyvinyl alcohol polymer solution or the water-containing polyvinyl alcohol polymer, wherein
  an amount of the polyvinyl alcohol polymer eluted when a 10 cm square of the polyvinyl alcohol polymer film having a thickness of 30 to 90 μm is left in 1 liter of water at 50 ° C. for 4 hours is from 1 to 60 ppm, and
  a content of an alkali metal compound in the polyvinyl alcohol polymer film is 0.5% by weight or less based on the polyvinyl alcohol polymer;
(2) dyeing with a dye, stretching and fixing the polyvinyl alcohol polymer film; and
(3) producing the polyvinyl alcohol polymer polarization film of claim 1.

* * * * *